UNITED STATES PATENT OFFICE.

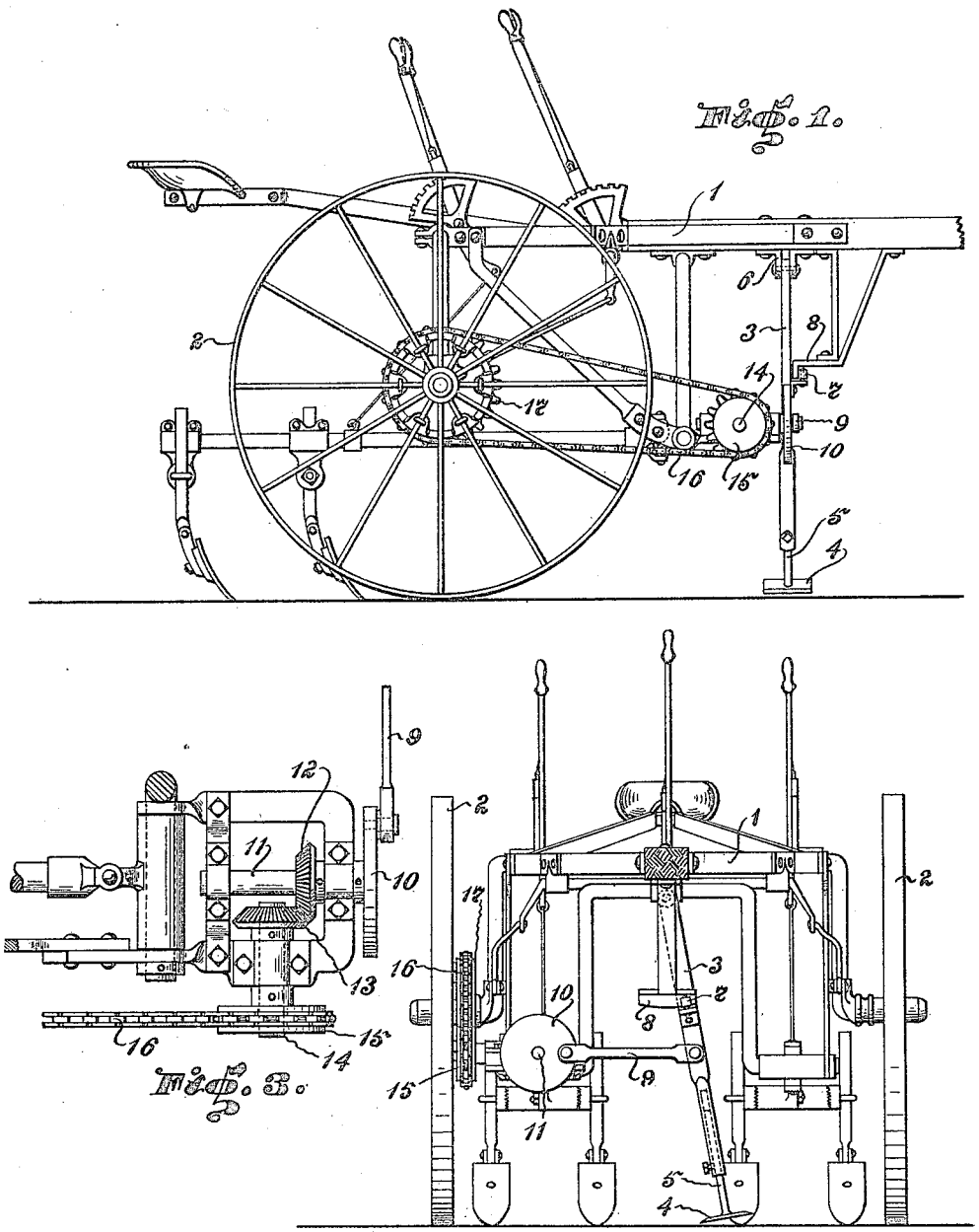

JAMES GORDON SIMS, OF BOWIE, TEXAS.

COTTON-CHOPPER.

1,225,066.　　　　　Specification of Letters Patent.　　　Patented May 8, 1917.

Application filed December 24, 1915. Serial No. 68,534.

*To all whom it may concern:*

Be it known that I, JAMES GORDON SIMS, a citizen of the United States, residing at Bowie, in the county of Montague and State of Texas, have invented certain new and useful Improvements in Cotton-Choppers, of which the following is a specification.

My invention has relation to improvements in cotton choppers and in such connection it relates more particularly to the construction and arrangement of the chopping hoe and the mechanism for oscillating said hoe as the implement is drawn through the field.

In devices of the kind to which my invention relates, it is desirable that the chopping tool or hoe and its operating mechanism shall be each of simple construction and it is also desirable that the movement of the hoe be oscillatory rather than rotary in the cutting out of the surplus plants.

By my present invention I have produced a cotton chopper having all these desirable features and in the carrying out of my invention the hoe or chopping tool is adjustably carried in the end of a swing arm to which arm oscillatory movement is given by an eccentric and pitman, the eccentric being driven from the axle or driving wheel of the vehicle.

The nature and scope of my invention will be more fully understood from the following description taken in connection with the accompanying drawings, forming part hereof, in which—

Figure 1 is a side elevational view of a cotton shopper embodying the main features of my invention;

Fig. 2, is a front elevational view thereof; and

Fig. 3, is an enlarged detail view illustrating the driving mechanism for the chopping hoe.

Referring to the drawings, 1 represents the top frame and 2, 2, the wheels of the vehicle.

From frame 1 is suspended the arm 3, carrying at its lower end the hoe 4, the handle 5 of which is adjustable up and down in said lower end of arm 3. The arm 3 is pivoted at its upper end in a bracket 6, and is provided with a rod or pin 7 swinging in and supported by a curved bearing piece 8 at the lower end of said bracket.

Oscillation of the arm 3 is secured through the pitman 9 operated by eccentric disk 10 carried at the end of a shaft 11. Miter gear 12 on the shaft 11 meshes with a similar gear 13 on a stub shaft 14. The shaft 14 is operated by a sprocket 15 keyed to said shaft and connected by chain 16 with a sprocket 17 carried by one of the wheels 2.

The cutting head of the hoe 4 is two edged so that the hoe will cut as it travels in either direction in its oscillation.

Having thus described the nature and objects of my invention, what I claim as new and desire to secure by Letters Patent is—

In a cotton chopper, a bracket supported by the frame of the implement, an arm pivoted at one end in said bracket and depending therefrom, a two edged hoe adjustably mounted in the lower end of said arm, a pitman arranged to swing said arm, and a means for guiding the arm in its oscillatory movement, said means consisting of a pin carried by the arm and a curved fixed bracing piece in which said pin is supported and guided.

In testimony whereof I have signed my name to this specification.

JAMES GORDON SIMS.

Copies of this patent may be obtained for five cents each, by addressing the "Commissioner of Patents, Washington, D. C."